US012645033B2

(12) United States Patent (10) Patent No.: US 12,645,033 B2
Wood et al. (45) Date of Patent: Jun. 2, 2026

(54) PHOTONIC LANTERNS COMPRISING OPTICAL FIBERS HAVING UP-DOWN DOPED CLADDINGS

(71) Applicant: CORNING INCORPORATED, Corning, NY (US)

(72) Inventors: William Allen Wood, Painted Post, NY (US); Jiangtao Wu, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 329 days.

(21) Appl. No.: 18/294,201

(22) PCT Filed: Jul. 28, 2022

(86) PCT No.: PCT/US2022/038619
§ 371 (c)(1),
(2) Date: Feb. 1, 2024

(87) PCT Pub. No.: WO2023/014563
PCT Pub. Date: Feb. 9, 2023

(65) Prior Publication Data
US 2024/0345325 A1 Oct. 17, 2024

Related U.S. Application Data

(60) Provisional application No. 63/228,806, filed on Aug. 3, 2021.

(51) Int. Cl.
*G02B 6/26* (2006.01)
(52) U.S. Cl.
CPC .................................... *G02B 6/262* (2013.01)

(58) Field of Classification Search
None
See application file for complete search history.

(56) References Cited

U.S. PATENT DOCUMENTS

| | | | |
|---|---|---|---|
| 9,276,371 B2 * | 3/2016 | Clowes | ................... G02F 1/365 |
| 9,411,100 B2 | 8/2016 | Fontaine et al. | |

(Continued)

FOREIGN PATENT DOCUMENTS

| | | |
|---|---|---|
| EP | 3029860 A1 | 6/2016 |
| WO | 2017/207952 A1 | 12/2017 |

OTHER PUBLICATIONS

Bade et al; "Fabrication and characterization of a mode-selective 45-mode spatial multiplexer based on multi-plane light conversion"; San Diego : s.n., 2018. OFC. p. Th4B.3, 6 Pages.

(Continued)

*Primary Examiner* — Andrew Jordan
(74) *Attorney, Agent, or Firm* — Svetlana Z. Short

(57) ABSTRACT

A photonic lantern includes three or more optical fibers housed within a glass capillary, each optical fiber includes a core and a cladding. The photonic lantern tapers between a first and second end such that a diameter of the glass capillary is greater at the first end than the second end and the cladding of at least two of the three or more optical fibers comprises an up-down doped cladding doped with a dopant combination that includes an up-dopant and a down-dopant. The up-dopant increases and the down-dopant decreases the effective refractive index of the up-down doped cladding. The dopant combination decreases a material viscosity of the up-down doped cladding such that a difference in the effective refractive index between a silica cladding and the up-down doped cladding is greater in a tapered region and at the second end than at the first end.

20 Claims, 10 Drawing Sheets

(56) References Cited

U.S. PATENT DOCUMENTS

| | | | | |
|---|---|---|---|---|
| 9,570,876 | B2 * | 2/2017 | Clowes | G02B 6/02347 |
| 10,454,607 | B2 * | 10/2019 | Li | H04B 10/60 |
| 2012/0200854 | A1 * | 8/2012 | Bland-Hawthorn | G02B 6/4215 |
| | | | | 356/300 |
| 2018/0241496 | A1 * | 8/2018 | Li | G02B 6/02004 |
| 2024/0345325 | A1 * | 10/2024 | Wood | G02B 6/24 |

OTHER PUBLICATIONS

Birks et al; "The photonic lantern"; 2015, Advances in Optics and Photonics, vol. 7, pp. 107-167.

Chang et al; "Mode-and wavelength-division multiplexed transmission using all-fiber mode multiplexer based on mode selective couplers"; Optics Express. 2015, vol. 23, 6, pp. 7164-7172.

Chang, Sun Hyok, et al. "All-fiber 6-mode multiplexers based on fiber mode selective couplers"; Optics Express. 2017, vol. 25, 5, pp. 5734-5741.

Correa; "All-fiber mode multiplexers"; Anaheim : s.n., 2016. OFC. p. Tu3I.3., 3 pages.

Fontain et al; "Geometric requirements for photonic lanterns in space division multiplexing"; 24, 2012, Optics Express, vol. 20, pp. 27123-27132.

Gross et al. "Beam shaping of a broad-area laser diode using 3D integrated optics"; Optics Letters. 2019, vol. 44, 4, pp. 831-834.

James C. Maxwell; "On the equilibrium of elastic eolids"; Transactions of the Royal Society of Edinburgh, 20(1), pp. 87-120. 1853.

Leon-Saval et al; "Multimode fiber devices with single-mode performance"; 19, 2005, Optics Letters, vol. 30, pp. 2545-2547.

Leon-Saval et al; "Photonic lantern as mode multiplexer for multimode optical communications"; 2017, Optical Fiber Technology, vol. 35, pp. 46-55.

Li et al; "Space-division multiplexing: the next frontier in optical communication"; 2014, Advances in Optics and Photonics, vol. 6, pp. 413-487.

Love, J. D., et al. "Tapered single-mode fibres and devices. Part 1: Adiabaticity criteria"; 5, 1991, IEE Proceedings-J, vol. 138, pp. 343-354.

Park et al; "All-fiber mode division multiplexer optimized for C-band"; San Francisco : s.n., 2014. OFC. p. M3K.2., 3 pages.

Primak et al; "Photoelastic constants of vitreous silica and its elastic coefficient of refractive index"; Journal of Applied Physics 30, 779 (1959).

Ryf et al; "Optical coupling components for spatial multiplexing in multi-mode fibers"; Geneva : s.n., 2011. ECOC. p. Th.12.B.1., 3 pages.

Sasaki et al; "Multicore fiber-based 5- mode multiplexer/ demultiplexer"; San Francisco : SPIE, 2015. SPIE OPTO. vol. 9389, 2 pages.

Sorin et al; "Phase-velocity measurements using prism output coupling for single-and few-mode optical fibers" published on Optics Letters, vol. 11, No. 2, p. 106, 1986, 3 pages.

Thomson et al; "Ultrafast laser processes for photonics"; San Diego : s.n., 2019. OFC. p. Th3D.1., 3 pages.

Velazquez-Benitez et al; "Scaling Photonic Lanterns for Space-Division Multiplexing"; Scientific Reports, (2018) 8:8897, 9 pages.

Wittek et al; "Mode-multiplexed transmission within and across mode groups of a multimode-fiber"; San Diego : s.n., 2019. OFC. p. M21.2., 3 pages.

Xia et al; "Demonstration of world's first few-mode GPON"; Cannes : s.n., 2014. ECOC. p. PD.1.5., 3 pages.

Yerolatsitis et al; "Tapered mode multiplexers for single mode to multi mode fibre mode transitions"; Los Angeles : s.n., 2015. OFC. p. W3B.4., 3 pages.

Yerolatsitis et al; "Three-mode multiplexer in photonic crystal fibre"; London : s.n., 2013. ECOC. p. Mo.4.A.4., 3 pages.

* cited by examiner

SECOND END OF THE
PHOTONIC LANTERN
(OUTPUT END)

Z LENGTH DIRECTION (mm)

FIRST END OF THE
PHOTONIC LANTERN
(INPUT END)

SECOND END OF THE
PHOTONIC LANTERN
(OUTPUT END)

Z LENGTH DIRECTION (mm)

FIRST END OF THE
PHOTONIC LANTERN
(INPUT END)

SECOND END OF THE
PHOTONIC LANTERN
(OUTPUT END)

POSITION (m)

FIRST END OF THE
PHOTONIC LANTERN
(INPUT END)

SECOND END OF THE
PHOTONIC LANTERN
(OUTPUT END)

POSITION (m)

FIRST END OF THE
PHOTONIC LANTERN
(INPUT END)

PHOTONIC LANTERNS COMPRISING OPTICAL FIBERS HAVING UP-DOWN DOPED CLADDINGS

CROSS-REFERENCE TO RELATED APPLICATIONS

This application claims the benefit of priority under 35 U.S.C. § 371 of International Application No. PCT/US2022/ 038619, filed on Jul. 28, 2022, which claims the benefit of priority under 35 U.S.C. § 119 of U.S. Provisional Application No. 63/228,806 filed Aug. 3, 2021, the content of which is incorporated herein by reference in its entirety.

BACKGROUND

Field

The present specification generally relates to photonic lantern comprising optical fibers having differing compositions.

Technical Background

Spatial division multiplexing includes the transmission of separate data streams on the individual modes of a multimode optical fiber or on the individual cores of a multicore fiber and facilitates an increase in the transmission capacity of optical communication. For example, spatial division multiplexing may facilitate transmission capacity on the order of a petabit/second per fiber. However, the implementation of spatial division multiplexing has numerous challenges, such as the reliable, low-loss excitation and detection of the individual modes of light propagating in a multi-mode optical fiber using inexpensive mode coupling devices.

An example mode coupling device for spatial division multiplexing is a fiber-based photonic lantern that may be used to optically couple a multi-mode optical fiber to several single-mode optical fibers. Photonic lanterns may reduce mode-dependent loss to improve mode-selective coupling. Currently, photonic lanterns include multiple identical single-mode optical fibers, which direct light comprising a combination of modes at their outputs, which are later untangled using digital signal processing. It is often of interest to be able to selectively launch individual groups of degenerate modes of a multi-mode optical fiber. If mode groups can be launched individually, then the digital signal processing required to sort out the modes on the receiving end might be simplified. In some cases, coupling between mode groups can be neglected and only coupling within mode groups needs to be untangled. To accomplish mode-selective launch, it is useful for the individual optical fibers of the photonic lantern have different effective refractive indices to maintain mode selectivity and modal isolation.

One current technique for maintaining mode selectivity and modal isolation along the length of the photonic lanterns includes using optical fibers having dissimilar core diameters, dissimilar cladding diameters, dissimilar fiber core and/or cladding refractive indices along the length of the photonic lantern, or combinations thereof. However such approaches are difficult because of the technical and logistical complexities arising from the use two operationally different fibers. Differences in refractive index of the optical fibers along the entire length of the photonic lantern means that, without potentially expensive mitigating steps, significant differences in connector and device losses between channels may occur. Moreover, requiring multiple fibers with different core and/or cladding diameters means more complex handling. For example, different tooling may be required for each optical fiber in a draw facility.

Accordingly, a need exists for an improved photonic lanterns for coupling single mode optical fibers to multimode optical fibers.

SUMMARY

According to a first aspect of the present disclosure, a photonic lantern includes three or more optical fibers housed within a glass capillary, each optical fiber includes a core surrounded by a cladding and a first end opposite a second end. The photonic lantern tapers between the first end and the second end such that a diameter of the glass capillary at the first end is greater than a diameter of the glass capillary at the second end and the cladding of at least two of the three or more optical fibers comprises an up-down doped cladding doped with a dopant combination includes an up-dopant and a down-dopant. The up-dopant increases the effective refractive index of the up-down doped cladding, the down-dopant decreases the effective refractive index of the up-down doped cladding, and the dopant combination decreases a material viscosity of the up-down doped cladding; and the cladding of at least one of the three or more optical fibers comprises a silica cladding. A difference in the effective refractive index between the silica cladding and the up-down doped cladding is greater in a tapered region and at the second end of the photonic lantern than at the first end of the photonic lantern.

A second aspect of the present disclosure includes the photonic lantern of the first aspect, wherein the three or more optical fibers each comprise a single mode optical fiber.

A third aspect of the present disclosure includes the photonic lantern of the first aspect or the second aspect, wherein the effective refractive index of the up-down doped cladding is less than the effective refractive index of the silica cladding in the tapered region and at the second end of the photonic lantern.

A fourth aspect of the present disclosure includes the photonic lantern of any of the previous aspects, wherein the effective refractive index of the up-down doped cladding differs from the effective refractive index of the silica cladding at the second end of the photonic lantern by 0.01% or more.

A fifth aspect of the present disclosure includes the photonic lantern of any of the previous aspects, wherein the effective refractive index of the up-down doped cladding differs from the effective refractive index of the silica cladding at the second end of the photonic lantern by 0.1% or more.

A sixth aspect of the present disclosure includes the photonic lantern of any of the previous aspects, wherein the up-dopant comprises germanium, chlorine, aluminum, titanium, phosphorous, or a combination thereof, and the down-dopant comprises fluorine, boron, or a combination thereof.

A seventh aspect of the present disclosure includes the photonic lantern of any of the previous aspects, wherein the dopant combination comprises 0.05 to 1.5 wt % fluorine and 0.4 to 6 wt % germanium.

An eighth aspect of the present disclosure includes the photonic lantern of any of the previous aspects, wherein the photonic lantern tapers between the first end and the second end such that a diameter of the cladding of each of the three or more optical fibers at the first end is greater than a diameter of the cladding of each of the three or more optical fibers at the second end and a diameter of the core of each of the three or more optical fibers at the first end is greater than a diameter of the core of each of the three or more optical fibers at the second end.

A ninth aspect of the present disclosure includes the photonic lantern of any of the previous aspects, wherein a taper ratio of the glass capillary, the cladding of each of the three or more optical fibers, and the core of each of the three or more optical fibers is from five to twenty.

A tenth aspect of the present disclosure includes the photonic lantern of any of the previous aspects, wherein the cladding of each of the three or more optical fibers retain matching diameters from the first end to the second end of the photonic lantern and the core of each of the three or more optical fibers retain matching diameters from the first end to the second end of the photonic lantern.

An eleventh aspect of the present disclosure includes the photonic lantern of any of the previous aspects, wherein the up-down doped cladding comprises a lower material viscosity, a lower elastic modulus, and a different coefficient of thermal expansion than the silica cladding.

According to a twelfth aspect of the present disclosure, a method includes directing light into a first end of a photonic lantern that includes three or more optical fibers housed within a glass capillary, each optical fiber comprising a core surrounded by a cladding, a second end opposite the first end, wherein the photonic lantern tapers between the first end and the second end such that a diameter of the glass capillary at the first end is greater than a diameter of the glass capillary at the second end, and the cladding of at least two of the three or more optical fibers comprises an up-down doped cladding doped with a dopant combination comprising an up-dopant and a down-dopant. The up-dopant increases the effective refractive index of the up-down doped cladding, the down-dopant decreases the effective refractive index of the up-down doped cladding, and the dopant combination decreases a material viscosity of the up-down doped cladding. The cladding of at least one of the three or more optical fibers comprises a silica cladding. A difference in the effective refractive index between the silica cladding and the up-down doped cladding is greater in a tapered region and at the second end of the photonic lantern than at the first end of the photonic lantern such that the light propagating from the first end to the second end of the photonic lantern retains modal isolation. The method further includes receiving the light output at the second end of the photonic lantern with a first end of a multi-mode optical fiber.

A thirteenth aspect of the present disclosure includes the method of the twelfth aspect, wherein the multi-mode optical fiber comprises a mode structure aligned with the mode structure of light exiting the second end of the photonic lantern such that a mode coupling efficiency between the three or more optical fibers of the photonic lantern and the multi-mode optical fiber is 79% or greater for a fundamental mode and at least two higher order modes excited in the multi-mode optical fiber.

A fourteenth aspect of the present disclosure includes the method of the twelfth aspect or the thirteenth aspect, wherein the multi-mode optical fiber comprises a mode structure aligned with the mode structure of light exiting the second end of the photonic lantern such that a modecouplingefficiencybetweenthethreeormoreopticalfibersofthephotoniclantemand the multi-mode optical fiber is 90% or greater for a fundamental mode and at least two higher order modes excited in the multi-mode optical fiber.

A fifteenth aspect of the present disclosure includes the method of any of the twelfth through fourteenth aspects, wherein the effective refractive index of the up-down doped cladding differs from the effective refractive index of the silica cladding at the second end of the photonic lantern by 0.05% or more.

A sixteenth aspect of the present disclosure includes the method of any of the twelfth through fifteenth aspects, wherein the effective refractive index of the up-down doped cladding differs from the effective refractive index of the silica cladding at the second end of the photonic lantern by 0.02% or more.

A seventeenth aspect of the present disclosure includes the method of any of the twelfth through sixteenth aspects, wherein the second end of the photonic lantern is optically coupled to the first end of the multi-mode optical fiber using free-space optics.

A eighteenth aspect of the present disclosure includes the method of any of the twelfth through seventeenth aspects, wherein the three or more optical fibers of the photonic lantern comprise single mode optical fibers.

According to an nineteenth aspect of the present disclosure, a method of manufacturing a photonic lantern includes applying heat to a central region of a photonic lantern preform, the photonic lantern preform including three or more optical fibers housed within a glass capillary, each optical fiber comprising a core surrounded by a cladding and a first preform end opposite a second preform end. The cladding of at least two of the three or more optical fibers comprises an up-down doped cladding doped with a dopant combination that decreases the effective refractive index of the up-down doped cladding, the dopant combination comprising an up-dopant that increases the effective refractive index of the up-down doped cladding and a down-dopant that decreases the effective refractive index of the up-down doped cladding and the cladding of at least one of the three or more optical fibers comprises a silica cladding. The method further includes stretching the photonic lantern preform in a first direction from the first preform end and in a second direction from the second preform end such that the photonic lantern preform tapers in the central region and separating the central region to form at least one photonic lantern from the photonic lantern preform. The photonic lantern comprises a first end corresponding with the first preform end of the photonic lantern preform and a second end corresponding with the central region of the photonic lantern preform, the photonic lantern tapers between the first end and the second end such that a diameter of the glass capillary at the first end is greater than a diameter of the glass capillary at the second end, and the silica cladding and the up-down doped cladding comprise matching effective refractive indices at the first end of the photonic lantern and comprise differing effective refractive indices in a tapered region and at the second end of the photonic lantern.

A twentieth aspect of the present disclosure includes the method of any of the nineteenth aspect, wherein applying heat to the central region of a photonic lantern preform heats the central region to a softening point of a glass material of the glass capillary.

A twenty-first aspect of the present disclosure includes the method of the nineteenth aspect or the twentieth aspect, wherein stretching the photonic lantern preform occurs while applying heat to the central region and the central region comprises a temperature of at least a softening point of the glass capillary.

A twenty-second aspect of the present disclosure includes the method of any of the eighteenth through twenty-first aspects, further including cooling the photonic lantern preform to room temperature subsequent to stretching the photonic lantern preform.

A twenty-third aspect of the present disclosure includes the method of any of the eighteenth through twenty-second aspects, wherein separating the central region forms a first photonic lantern and a second photonic lantern from the photonic lantern preform. The first photonic lantern comprises a first end corresponding with the first preform end of the photonic lantern preform and a second end corresponding with the central region of the photonic lantern preform and the second photonic lantern comprises a first end corresponding with the second preform end of the photonic lantern preform and a second end corresponding with the central region of the photonic lantern preform.

Additional features and advantages of the processes and systems described herein will be set forth in the detailed description which follows and, in part, will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute apart of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
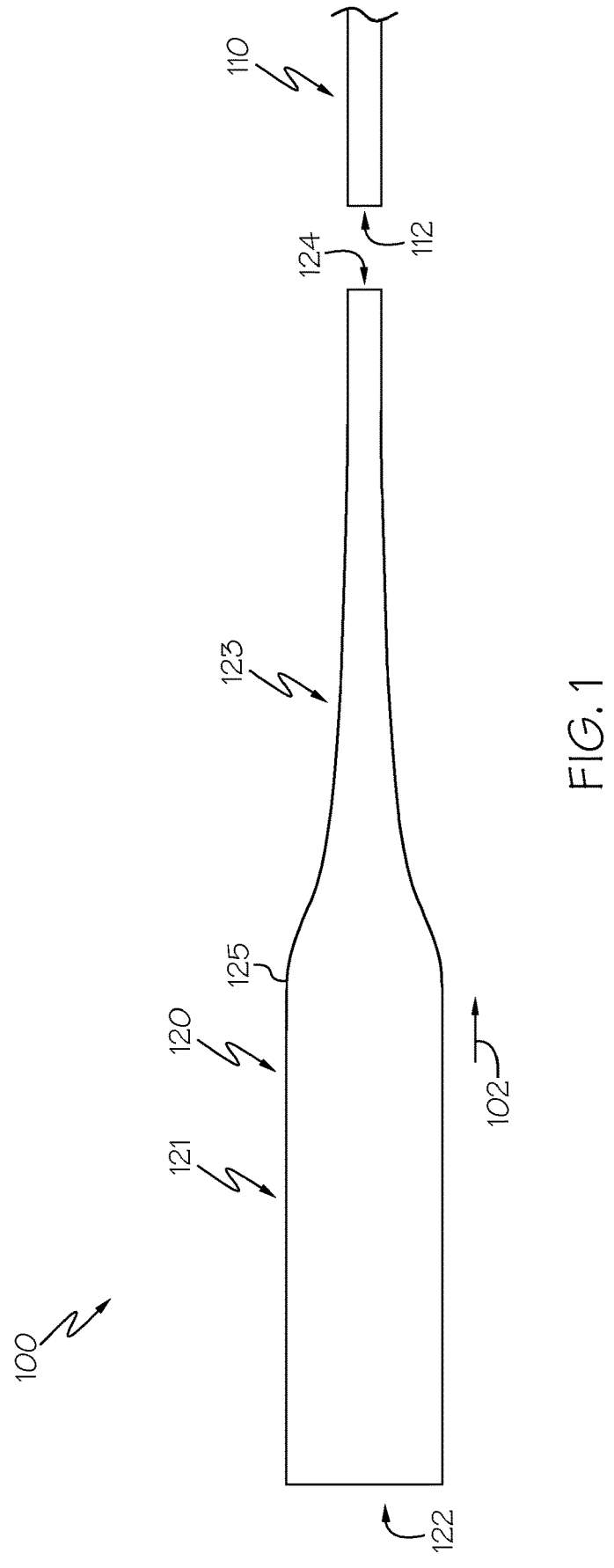
FIG. 1 schematically depicts an optical assembly comprising a photonic lantern and a multi-mode optical fiber, according to one or more embodiments described herein.

Reference will now be made in detail to embodiments of a photonic lantern and optical systems comprising a photonic lantern and a multi-mode optical fiber. The photonic lantern described herein comprises three or more optical fibers housed within a glass capillary having a lower refractive index than the cores and claddings of the three or more optical fibers. The photonic lantern tapers from a first end to a second end. As photonic lantern tapers, the radius of each optical fiber decreases such that individual cores of the optical fibers are unable to confine the modes of light propagating through the photonic lantern. This causes the modes to spread into the cladding of each optical fiber. The lower refractive index of the glass capillary relative to the claddings causes the claddings of the optical fibers to continue to guide light. Because the claddings, not the cores of the optical fibers are guiding light, it is difficult to maintain modal isolation between the modes propagating in each optical fiber.

In the embodiments described herein, modal isolation along the length of the photonic lantern is achieved by using optical fibers with claddings having the same effective refractive indices at the first end of the photonic lantern, but differing effective refractive indices in the tapered portion of and at the second end of the photonic lantern, and diameters that remain equal to each other along the length of the photonic lantern. To achieve these effective refractive indices, the claddings of the optical fibers have differing glass compositions that induce different residual stress that occur in the claddings when the photonic lantern is manufactured using a draw process. These residual stresses cause divergence of the effective refractive indices of the claddings with differing compositions as the photonic lantern tapers. Thus, in a tapered region of the photonic lantern, the differing effective refractive indices of the cladding maintain mode selectivity. This facilitates matching of the local mode structure of light at the second end of the photonic lantern with the local mode structure of the multi-mode optical fiber at the first end of the multi-mode optical fiber. Embodiments of photonic lanterns will now be described and, whenever possible, the same reference numerals will be used through-out the drawings to refer to the same or like parts.

As used herein, "residual stress" refers to a process-induced stress, frozen in a drawn part, that exists in a body in the absence of external loading or thermal gradients.

As used herein, "effective refractive index" can be given for a component (e.g., a waveguide) as a measure of the phase velocity of a light beam in that component, compared to the propagation of light in a vacuum. The effective refractive index $n_{eff}$ has the analogous meaning for light propagation in a waveguide; the $\beta$ value (phase constant) of the waveguide (for some wavelength) is the effective index times the vacuum wave number, that is, $$\beta = n_{eff} \frac{2\pi}{\lambda}.$$

One method to measure effective refractive index is the prism coupling technique which is described in "Phase-velocity measurements using prism output coupling for single- and few-mode optical fibers" published on OPTICS LETTERS, Vol. 11, No. 2, p. 106, 1986. Another method for measuring the effective refractive index is to write a grating of known period into a waveguide under test and measure the modification of its transmission spectrum. It should be understood that each of the above measurement methods apply to uniform waveguides with constant effective refractive indices over the measured lengths. Tapered waveguides exhibit locally varying effective indices. Thus, effective refractive index at a location of a tapered region of a waveguide is the effective refractive index of a uniform waveguide with the same dimensions as the tapered region at the point of measurement.

As used herein, "mode group" refers to collections of degenerate modes. For standard multi-mode optical fibers, modes are degenerate when they have equal modal effective refractive indices.

As used herein, "modal isolation" is a property used to describe two or more mode groups of light which have an amount crosstalk between one another of −10 dB or less.

Figure 2A:
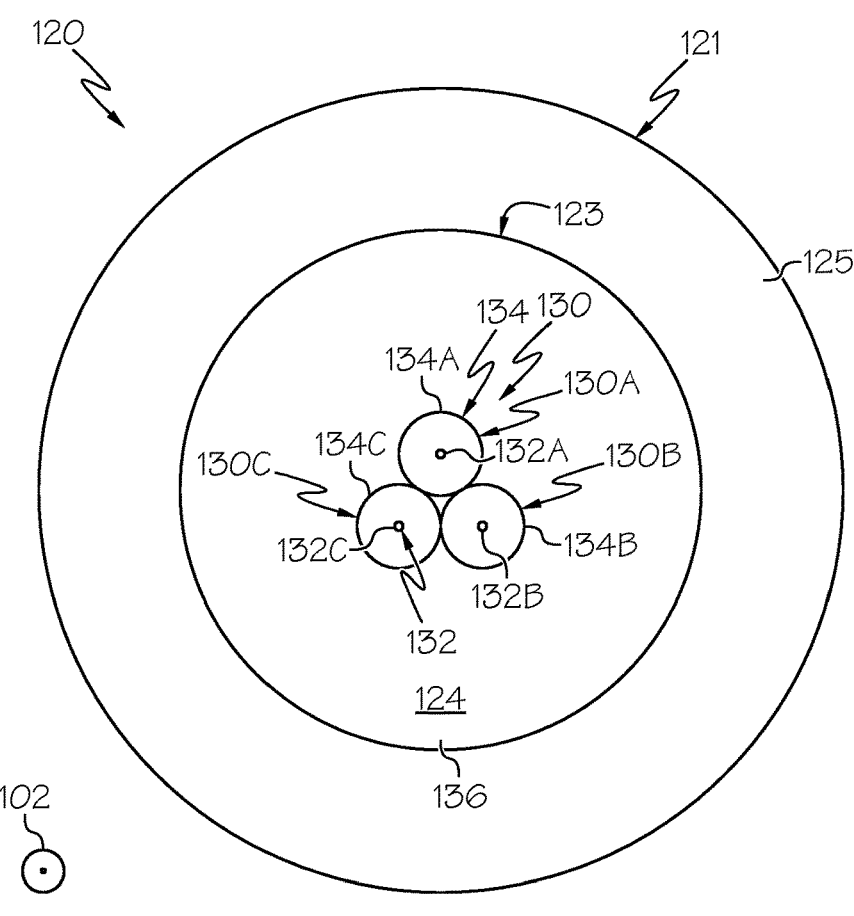
FIG. 2A schematically depicts an end view of a second end of the photonic lantern of FIG. 1, according to one or more embodiments described herein.
Figure 2B:
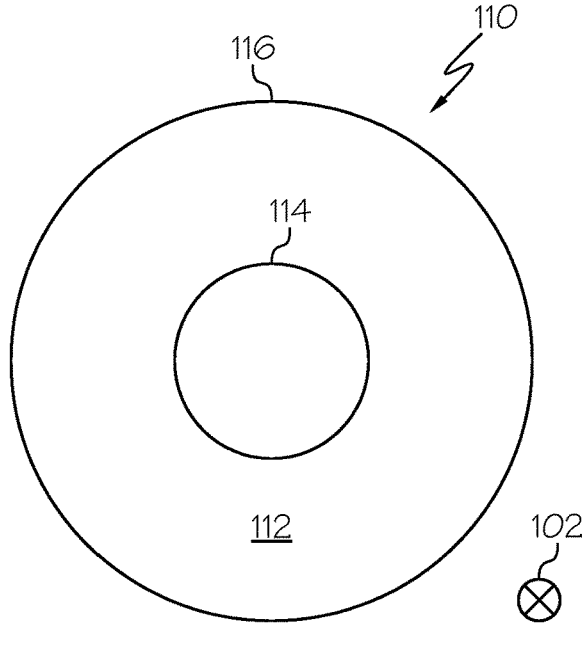
FIG. 2B schematically depicts an end view of a first end of the multi-mode optical fiber of FIG. 1, according to one or more embodiments described herein.
Figure 2C:
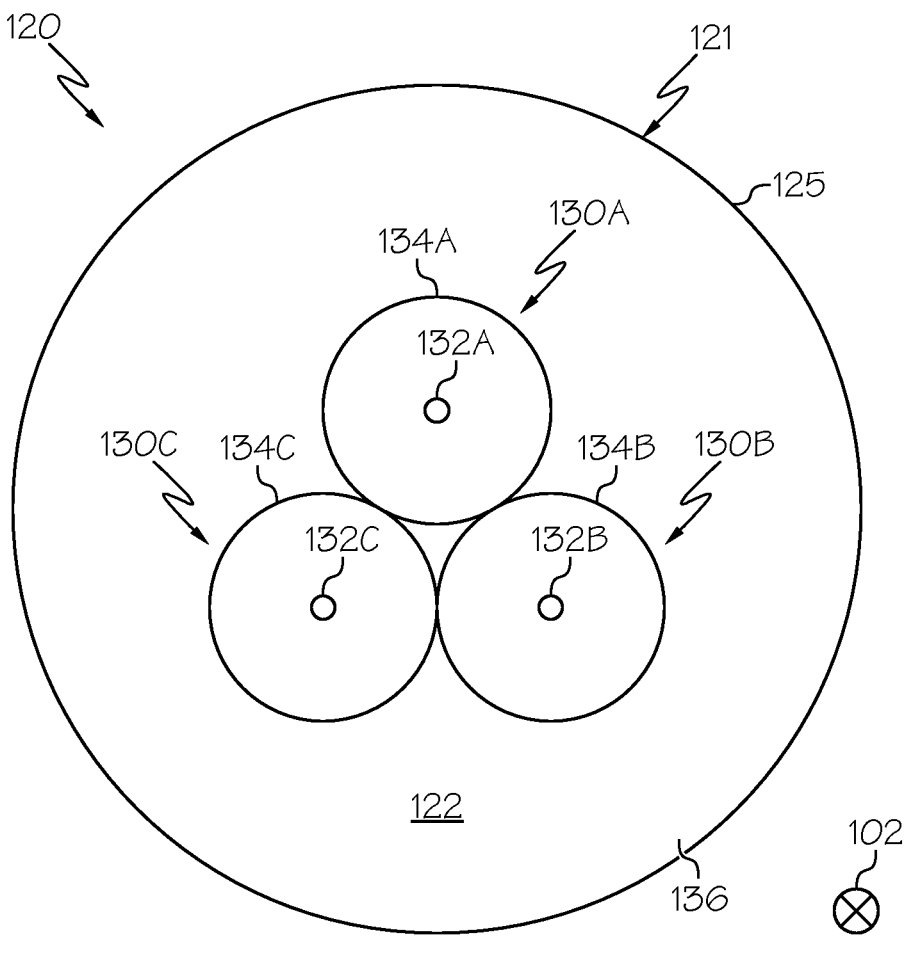
FIG. 2C schematically depicts an end view of a first end of the photonic lantern of FIG. 1, according to one or more embodiments described herein.

Referring now to FIG. 1, an optical assembly 100 comprising a photonic lantern 120 and a multi-mode optical fiber 110 is schematically depicted. The photonic lantern 120 comprises a first end 122, a second end 124 opposite the first end 122, and an outer surface 125. The photonic lantern 120 tapers between the first end 122 and the second end 124, forming a tapered region 123. In the optical assembly 100, the second end 124 of the photonic lantern 120 faces a first end 112 of the multi-mode optical fiber 110, optically coupling the photonic lantern 120 and the multi-mode optical fiber 110. In some embodiments, the second end 124 of the photonic lantern 120 is optically coupled to the first end 112 of the multi-mode optical fiber 110 using free-space optics, such as one or more lenses. In some embodiments, the second end 124 of the photonic lantern 120 is optically coupled to the first end 112 of the multi-mode optical fiber 110 by splicing. FIGS. 2A-2C depict end views of the photonic lantern 120 and the multi-mode optical fiber 110. In particular, FIG. 2A depicts an end view (e.g., an end on three-dimensional view) of the second end 124 of the photonic lantern 120, FIG. 2B depicts an end view (e.g., an end on three-dimensional view) of the first end 112 of the multi-mode optical fiber 110, and FIG. 2C depicts an end view (e.g., an end on three-dimensional view) of the first end of 122 of the photonic lantern 120. In addition, FIG. 3 depicts another schematic view of the photonic lantern 120.

Figure 3:
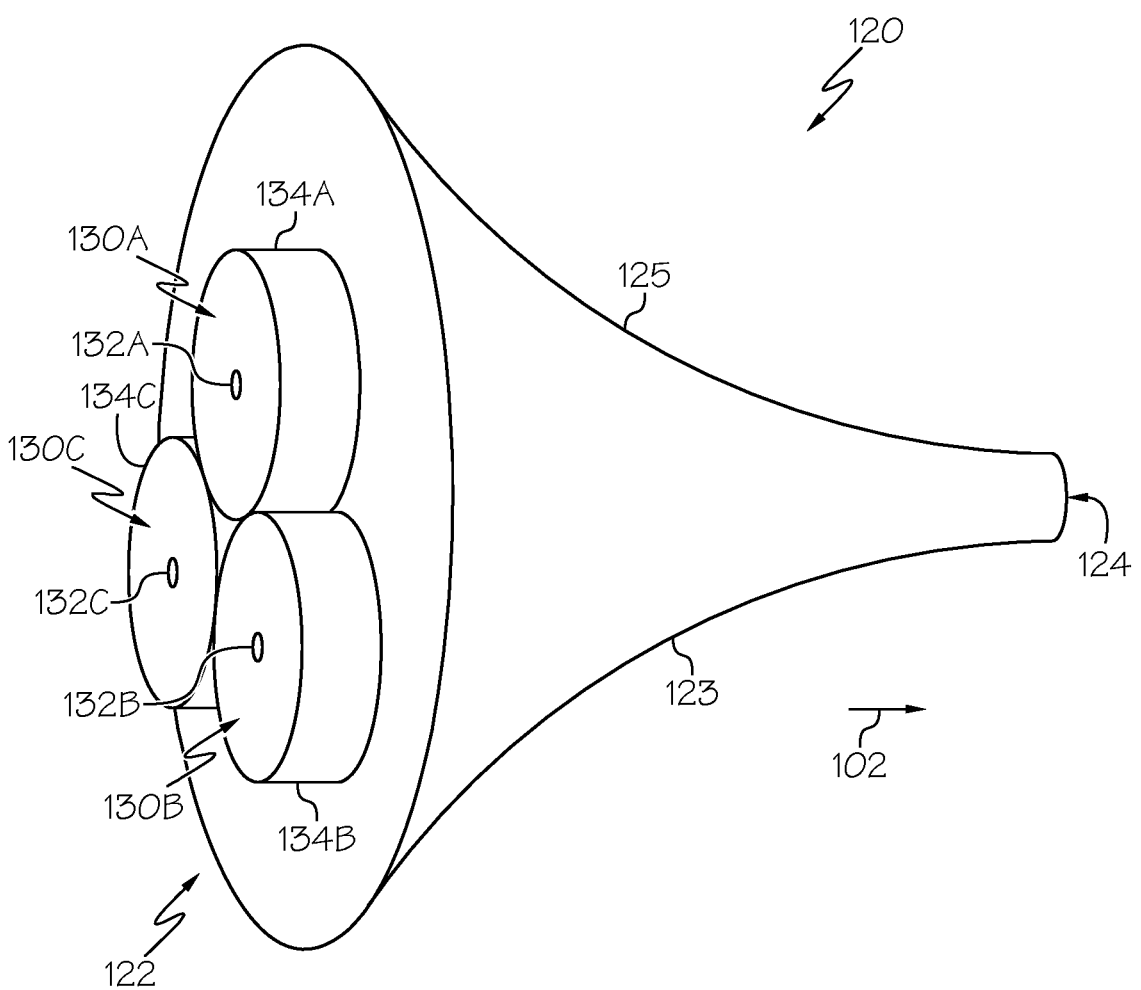
FIG. 3 schematically depicts the photonic lantern of FIG. 1, according to one or more embodiments described herein.

Referring now to FIGS. 1-3, the photonic lantern 120 comprises three or more optical fibers 130 housed within a glass capillary 136 and the multi-mode optical fiber 110 comprises a core 114 surrounded by a cladding 116. Each optical fiber 130 of the photonic lantern 120 comprises a core 132 surrounded by a cladding 134. In some embodiments, the three or more optical fibers 130 of the photonic lantern 120 each comprise a single mode optical fiber. In FIGS. 1-3, the photonic lantern 120 comprises a first optical fiber 130A having a first core 132A surrounded by a first cladding 134A, a second optical fiber 130B having a second core 132B surrounded by a second cladding 134B, a third optical fiber 130C having a third core 132C surrounded by a third cladding 134C. While three optical fibers are depicted in the photonic lantern 120, it should be understood that photonic lanterns comprising more than three optical fibers are contemplated, for example, in embodiments used to direct light into multi-mode optical fibers that support more than two mode groups.

Referring now to FIG. 2B, the core 114 of the multi-mode optical fiber 110 supports at least three modes, including an $LP_{01}$ mode (i.e., a "fundamental mode") and two $LP_{11}$ modes (i.e., "higher-order" modes). The two $LP_{11}$ modes have the same effective refractive index and form a mode group. The fundamental mode's $LP_{01}$ effective refractive index is higher than higher order mode's $LP_{11}$ effective refractive index. Because the effective refractive index of the higher order modes $LP_{11}$ are equal, the two $LP_{11}$ modes couple strongly in the multi-mode optical fiber 110.

Because the photonic lantern 120 tapers between the first end 122 and the second end 124, a diameter of the glass capillary 136 at the first end 122 is greater than a diameter of the glass capillary 136 at the second end 124. Due to this taper, a diameter of the cladding 134A, 134B, 134C of each of the three or more optical fibers 130A, 130B, 130C at the first end 122 is greater than a diameter of the cladding 134A, 134B, 134C of each of the three or more optical fibers 130A, 130B, 130C at the second end 124 and a diameter of the core 132A, 132B, 132C of each of the three or more optical fibers 130A, 130B, 130C at the first end 122 is greater than a diameter of the core 132A, 132B, 132C of each of the three or more optical fibers 130A, 130B, 130C at the second end 124. In some embodiments, a diameter of the core 132A, 132B, 132C of each of the three or more optical fibers 130A, 130B, 130C at the first end 122 may be in a range of from 5 µm to 20 µm, such as 6 µm, 7 µm, 8 µm, 8.4 µm, 9 µm, 10 µm, 11 µm, 12 µm, 13 µm, 14 µm, 15 µm, 16 µm, 17 µm, 18 µm, 19 µm, 20 µm and any range comprising any two of these values as endpoints. In some embodiments, a diameter of the core 132A, 132B, 132C of each of the three or more optical fibers 130A, 130B, 130C at the second end 124 may be in a range of from 0.25 µm to 4 µm, such as 0.5 µm, 1 µm, 1.5 µm, 2.5 µm, 3 µm, 3.5 µm, 4 µm and any range comprising any two of these values as endpoints. In some embodiments, a diameter of the cladding 134A, 134B, 134C of each of the three or more optical fibers 130A, 130B, 130C at the first end 122 may be in a range of from 70 µm to 150 µm, such as 75 µm, 80 µm, 85 µm, 90 µm, 100 µm, 110 µm, 120 µm, 125 µm, 130 µm, 140 µm and any range comprising any two of these values as endpoints. In some embodiments, a diameter of the cladding 134A, 134B, 134C of each of the three or more optical fibers 130A, 130B, 130C at the second end 124 may be in a range of from 4 µm to 20 µm, such as 5 µm, 7 µm, 10 µm, 12 µm, 15 µm, 18 µm and any range comprising any two of these values as endpoints.

The cladding 134A, 134B, 134C of each of the three or more optical fibers 130A, 130B, 130C taper such that they retain matching diameters from the first end 122 to the second end 124 of the photonic lantern 120. As used herein, "matching diameters" refer to diameters that are within 2.5% of each other. Similarly, the core 132A, 132B, 132C of each of the three or more optical fibers 130A, 130B, 130C taper such that they retain matching diameters from the first end 122 to the second end 124 of the photonic lantern 120. A size ratio between the diameter of the glass capillary 136 at the first end 122 and the second end 124 of the photonic lantern 120 (i.e., a taper ratio of the glass capillary 136) may be from 2 to 50, such as from 5 to 20, such as 6, 7, 8, 9, 10, 11, 12, 13, 14, 15, 16, 17, 18, 19, and any range comprising any two of these values as endpoints. A size ratio between the diameter of the cladding 134A, 134B, 134C at the first end 122 and the second end 124 of the photonic lantern 120 (i.e., a taper ratio of the cladding 134A, 134B, 134C) may be from 2 to 50, such as from 5 to 20, such as 6, 7, 8, 9, 10, 11, 12, 13, 14, 15, 16, 17, 18, 19, and any range comprising any two of these values as endpoints. In addition, a size ratio between the diameter of the core 132A, 132B, 132C at the first end 122 and the second end 124 of the photonic lantern 120 (i.e., a taper ratio of the core 132A, 132B, 132C) may be from 2 to 50, such as from 5 to 20, such as 5, 6, 7, 8, 9, 10, 11, 12, 13, 14, 15, 16, 17, 18, 19, 20 and any range comprising any two of these values as endpoints.

Referring still to FIGS. 1-3 the cladding 134A, 134B, of at least two of the three or more optical fibers 130A, 130B comprises an up-down doped cladding doped with a dopant combination comprising an up-dopant and a down-dopant. The cladding 134C of at least one of the three or more optical fibers 130C comprises a silica cladding. In the example of FIGS. 1-3, the first cladding 134A and the second cladding 134B each comprise an up-down doped cladding and the third cladding 134C comprises the silica cladding. The up-dopant increases the effective refractive index of the up-down doped cladding. The down-dopant decreases the effective refractive index of the up-down doped cladding. The dopant combination is such that a difference in the effective refractive index between the silica cladding 134C and the up-down doped claddings 134A, 134B is greater in the tapered region 123 and at the second end 124 of the photonic lantern 120 than at the first end 122 of the photonic lantern 120. In some embodiments, the effective refractive index of the up-down doped claddings 134A, 134B is less than the effective refractive index of the silica cladding 134C in the tapered region 123 of the photonic lantern 120 and at the second end 124 of the photonic lantern 120.

To achieve this variable effective refractive index, the dopant combination decreases a material viscosity of the up-down doped cladding 134A, 134B and softens the glass of the up-down doped cladding 134A, 134B. While not intending to be limited by theory, the effective refractive index difference of the of the up-down doped claddings 134A, 134B and the silica cladding 134C in the tapered region 123 is due to the differences in material viscosity between the up-down doped claddings 134A, 134B and the silica cladding 134C, which causes differing material responses to the stretching process used to form the tapered shape of the photonic lantern 120. In particular, as the photonic lantern 120 is cooled, the silica cladding 134C undergoes more of the axial stress than the up-down doped claddings 134A, 134B, resulting in a net effective refractive index increase in the silica cladding 134C relative to the up-down doped claddings 134A, 134B in the tapered region 123 of the photonic lantern 120.

Doping with just one of the up-dopant or the down dopant would alter the effective refractive index of the up-down doped claddings 134A, 134B with respect to the silica cladding 134C along the entire length of the photonic lantern 120, including at the first end 122 of the photonic lantern 120. To avoid this, the up-down doped claddings 134A, 134B include offsetting amounts of up-dopant and down-dopant such that the effective refractive index is unchanged at the first end 122 and is only altered when the material of the photonic lantern 120 is stretched during production. For example, the effective refractive index of the up-down doped claddings 134A, 134B differs from the effective refractive index of the silica cladding 134C at the second end of the photonic lantern by 0.01% or more, such as 0.02% or more, 0.05% or more, 0.075% or more, 0.1% or more, 0.125% or more, 0.15% or more, 0.2% or more, 0.25% or more, 0.3% or more, or any range having any two of these values as endpoints. In some embodiments, the effective refractive index of the up-down doped claddings 134A, 134B differs from the effective refractive index of the silica cladding 134C at the second end of the photonic lantern in a range of from 0.01% to 0.2%. Differences in effective refractive indices that fall within this range provide modal isolation while minimizing the amount of dopant needed, reducing the manufacturing cost and manufacturing difficulty of the photonic lantern 120. In some embodiments, for light comprising a wavelength of 1550 nm, both the up-down doped claddings 134A, 134B and the silica cladding 134C have an effective refractive index in a range of from 1.445 to 1.444 at the first end 122. At the second end 124, the effective refractive index of the up-down doped claddings 134A, 134B are in a range of from 1.442 to 1.440 while the effective refractive index of the silica cladding 134C is in a range of from 1.4435 to 1.4425. It should be understood that these effective refractive index values will vary depending on the wavelength of light. However, the relative difference in the effective refractive index between the up-down doped claddings 134A, 134B and the silica cladding 134C at the second end 124 will remain regardless of the wavelength of light.

Referring still to FIGS. 1-3, the up-dopant may comprise germanium (Ge) and the down-dopant may comprise fluorine (F). In one embodiment, the Ge up-dopant is provided in the form of $GeO_2$. The amount of $GeO_2$ doped into the cladding 134A, 134B may be in the range from 0.2% by weight to about 10% by weight, for example, from 0.1% by weight to 6% by weight. In some embodiments, F as a down-dopant is doped into the up-down doped claddings 134A, 134B in the range from 0.01% by weight to about 5% by weight, for example, from about 0.05% by weight to 1.5% by weight. In some embodiments, the dopant combination comprises more of the up-dopant than the down-dopant by weight percentage. For example, in some embodiments, the dopant combination comprises F in a range of from 0.05% by weight to 1.5% by weight and comprises Ge in a range of from 0.4% by weight to 6% by weight. These weight percentages are weight percentages of the up dopant and down dopant in the total composition of the up-down doped claddings 134A, 134B. Furthermore, it should be understood that other up-dopants may be used to form the up-down doped claddings 134A, 134B. For example, other up-dopants include chlorine, aluminum, titanium, and phosphorous, such as phosphorous pentoxide, and other down-dopants include boron. Moreover, it should be understood that the weight ratio of up-dopant and down-dopant may be tuned depending on the level of residual stress difference between the up-down doped claddings 134A, 134B and the silica claddings 134C needed to achieve the desired effective refractive index difference. Increasing the amount of both the up-dopant and the down-dopant may increase the effective refractive index difference between the optical fibers 120 in the tapered region 123 and at the second end 124 of the photonic lantern 120 and tuning the relative amounts of up-dopant and down-dopant may retain equal effective refractive indices at the first end 122 of the photonic lantern 120.

Figure 4:
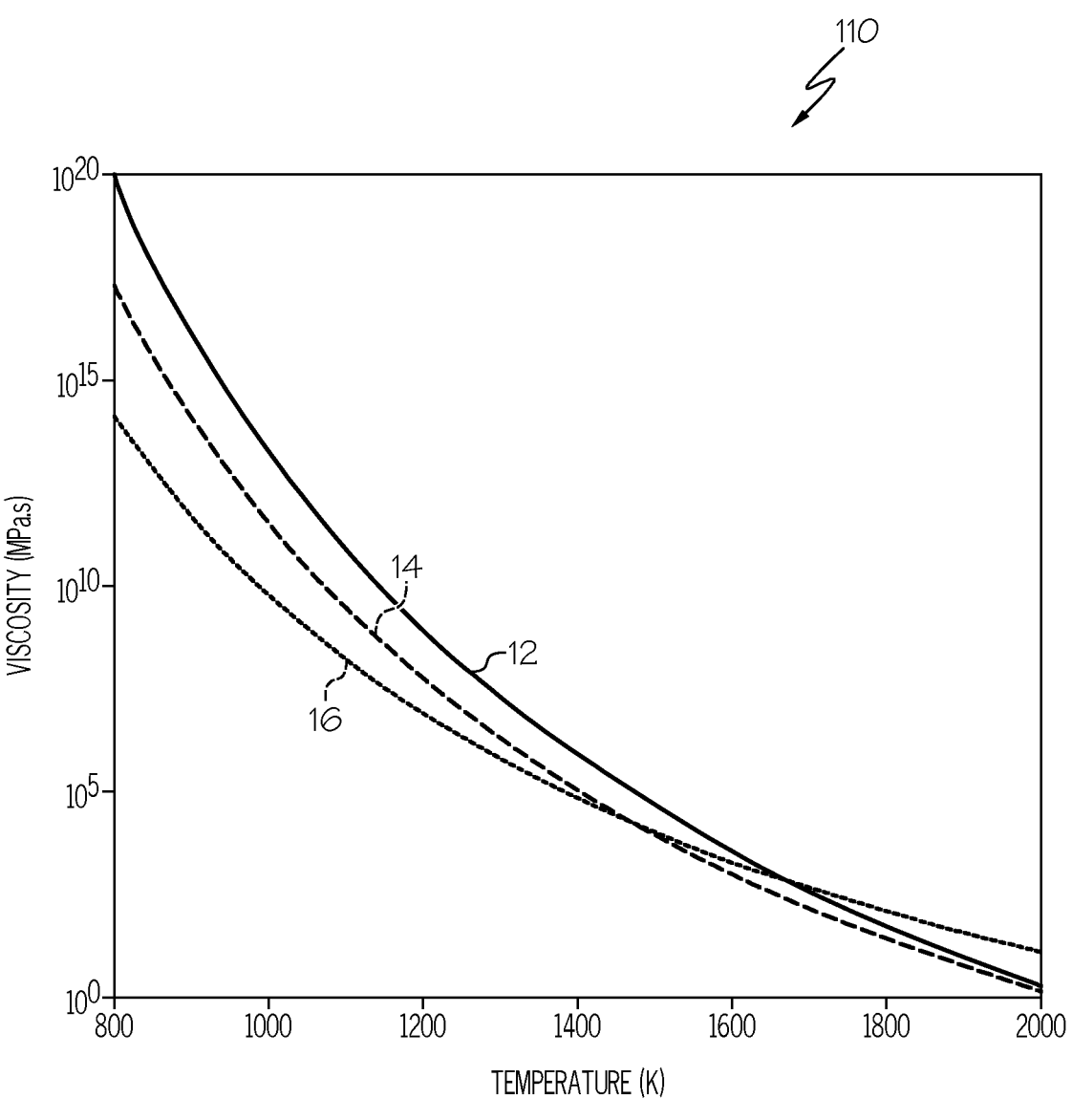
FIG. 4 graphically depicts the material viscosity of a silica cladding, a glass capillary, and an up-down doped cladding, according to one or more embodiments described herein.

Referring now to FIG. 4, graph 10 shows the material viscosity of the silica cladding 134C (line 12), the glass capillary 136 (line 14), and the up-down doped cladding 134A, 134B (line 16) as a function of temperature. Line 14 depicts an example up-down doped cladding 134A, 134B doped with 5 wt % Ge and 1 wt % F. As shown, the silica cladding 134C has the highest material viscosity and the material viscosity of the up-down doped claddings 134A, 134B is reduced by the dopants. In addition, the elastic modulus E of the up-down doped claddings 134A, 134B is also reduced by the up-dopants and the down-dopants. For example, the elastic modulus E of up-down doped cladding 134A, 134B doped with Ge and F can be described by the empirical relationship $E=69181-273.7$ (wt % of Ge)$-4509.8$ (wt % of F), where the elastic modulus is measure in megaPascals (MPa). In addition, the dopants also cause the coefficient of thermal expansion (CTE) to change. Up-dopants increase the CTE while down-dopants decrease the CTE of the up-down doped cladding 134A, 134B. Indeed, the up-down-doped claddings 134A, 134B comprise a higher CTE than the silica cladding 134C. These material property differences can create the residual stress difference between the silica cladding 134C and the up-down-doped cladding 134A, 134B.

Figures 5A, 5B:
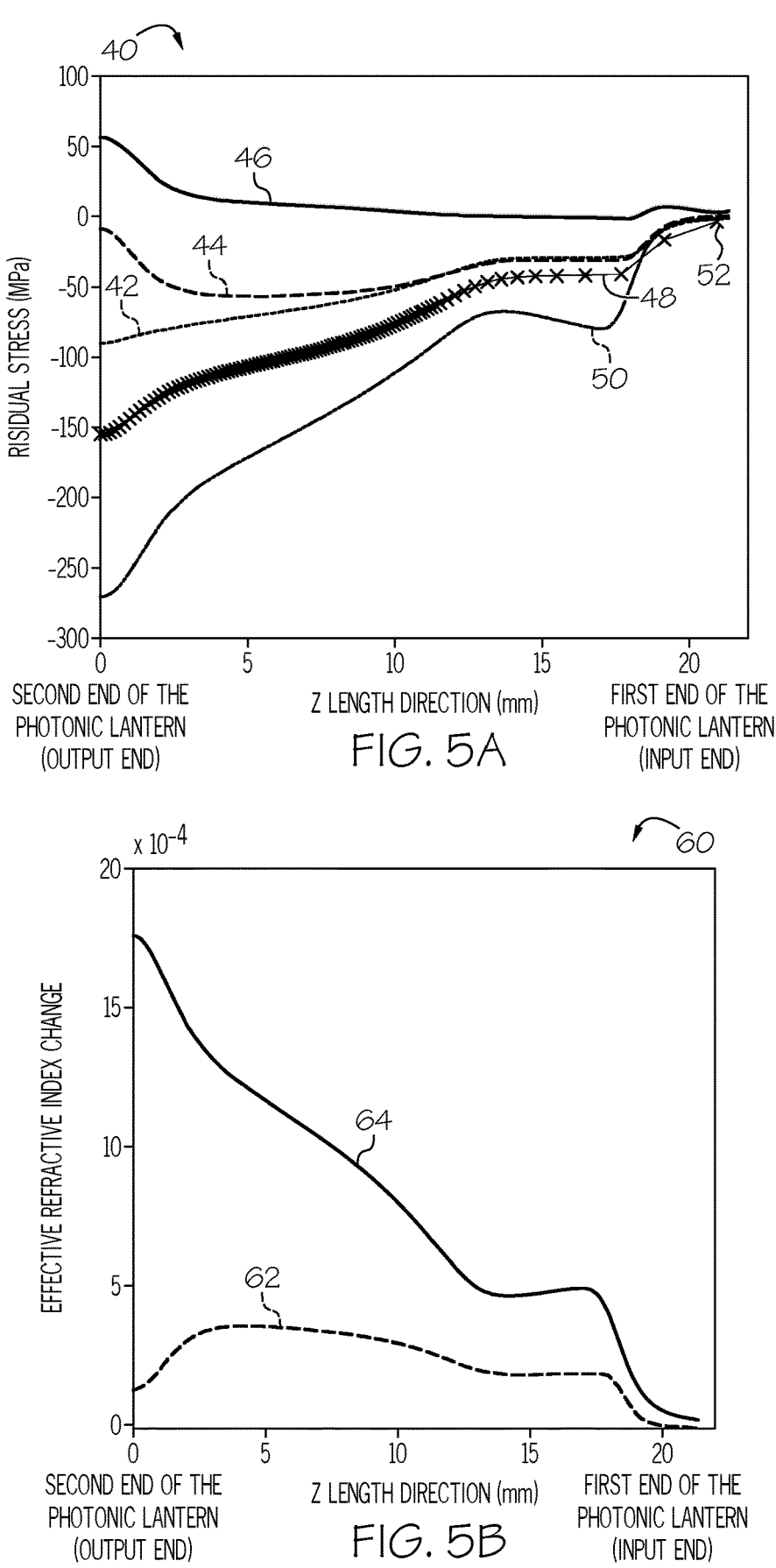
FIG. 5A graphically depicts the cylindrical coordinate residual stress components for an up-down doped cladding and a silica cladding of an example photonic lantern as a function of position along the length of the photonic lantern, according to one or more embodiments described herein.
FIG. 5B graphically depicts the effective refractive index change for an up-down doped cladding and a silica cladding of an example photonic lantern as a function of position along the length of the photonic lantern, according to one or more embodiments described herein.

Referring now to FIG. 5A, graph 40 depicts the residual stress of different cladding materials along the length of an example photonic lantern in cylindrical coordinates. In particular, line 42 depicts the radial (r) component of residual stress of an up-down doped cladding doped with Ge and F (such as up-down doped claddings 134A, 134B). Line 44 depicts the axial (z) component of residual stress of an up-down doped cladding doped with Ge and F. Line 46 depicts the azimuthal ($\theta$) component of residual stress of an up-down doped cladding doped with Ge and F. Line 48 depicts the radial (r) component of residual stress of a silica cladding (such as silica cladding 134C). Line 50 depicts the axial (z) component of residual stress of a silica cladding. Line 52 depicts the azimuthal ($\theta$) component of residual stress of a silica cladding. As shown by lines 48, 50, and 52, the silica cladding has a higher compression stress at the output end (e.g., the second end 124) of the example photonic lantern and thus the stress magnitude increases from the input end to output end (e.g., from the first end 122 to the second end 124).

The relationship between the residual stress a and the effective refractive index change $\Delta n_i$ is shown by the following equation: $\Delta n_i = C_1\sigma_i + C_2(\sigma_j + \sigma_k)$. $C_1$ and $C_2$ are photoelastic constants. $C_1 = -0.65$ TPa$^{-1}$ and $C_2 = -4.22$ TPa$^{-1}$. In addition, i, j, k=1, 2, 3 and represent three principle stress directions separately. That is, i represents the radial component of residual stress, j represents the axial component of residual stress, and k represents the azimuthal component of residual stress. As shown by the above equation, the refractive index change is a linear combination of the components of residual stress. Moreover, it should be understood that compression stress can cause an increase of the effective refractive index and an increase in tensile stress can cause a decrease in the effective refractive index.

Graph 60 of FIG. 5B depicts the effective refractive index of the silica cladding 134C (line 62) and the up-down doped cladding 134A, 134B (line 64) along the length of the photonic lantern 120. In particular, graph 60 shows the effective refractive index change of the up-down doped claddings 134A, 134B and the silica cladding 134C caused by the residual stress. As shown by line 62, the effective refractive index of the silica cladding 134C increases about 0.18% at the second end 124 of the photonic lantern 120 while the effective refractive index of the up-down doped claddings 134A, 134B have a minimal change along the length of the photonic lantern 120. Thus, at the second end 124 of the photonic lantern, the effective refractive indices of the silica cladding 134C and the up-down doped claddings 134A, 134B differ by about 0.18%.

Figure 6A:
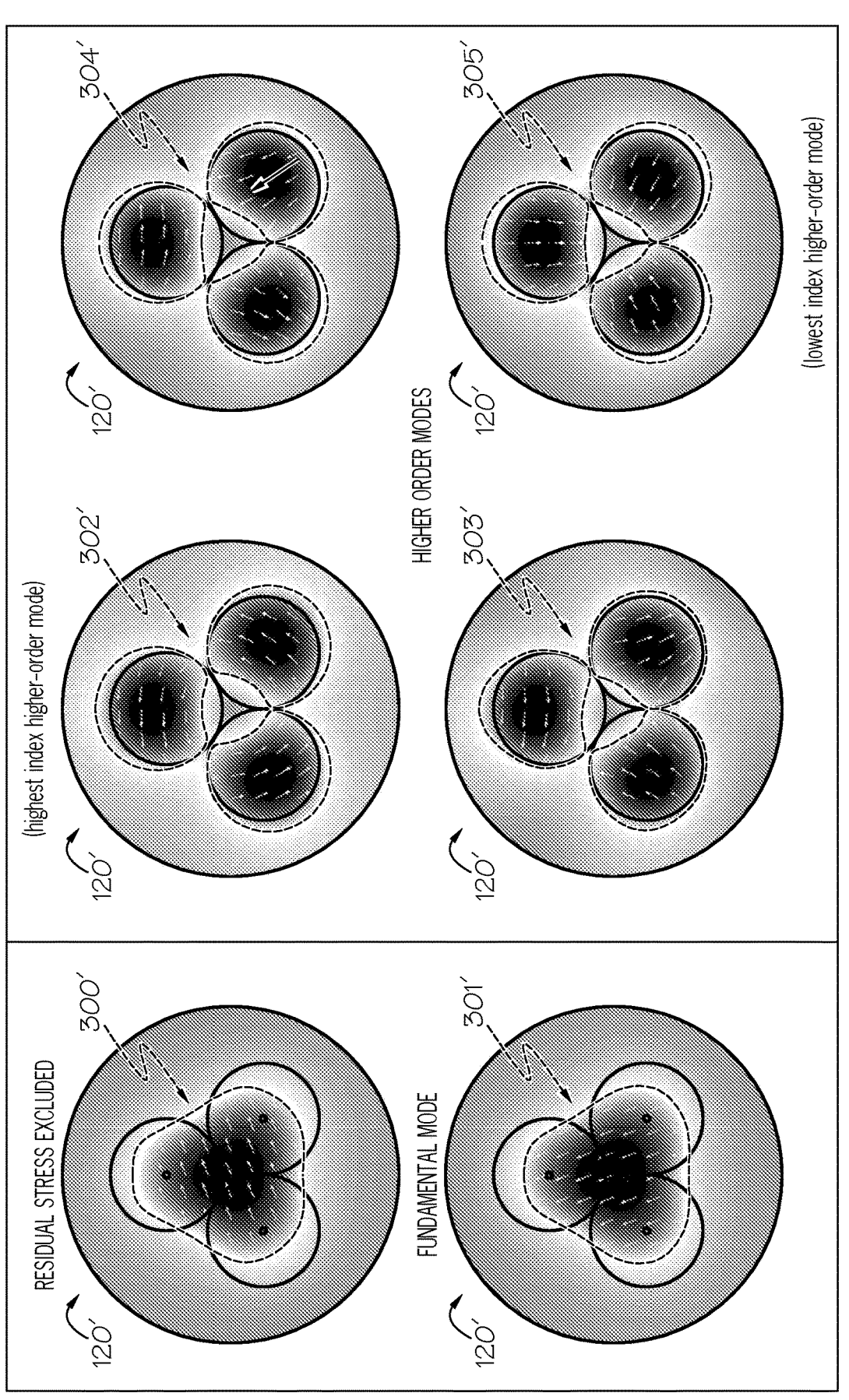
FIG. 6A schematically depicts the spatial mode structure of the second end of an example photonic lantern having claddings with equal effective refractive indices at the second end, according to one or more embodiments described herein.
Figure 6B:
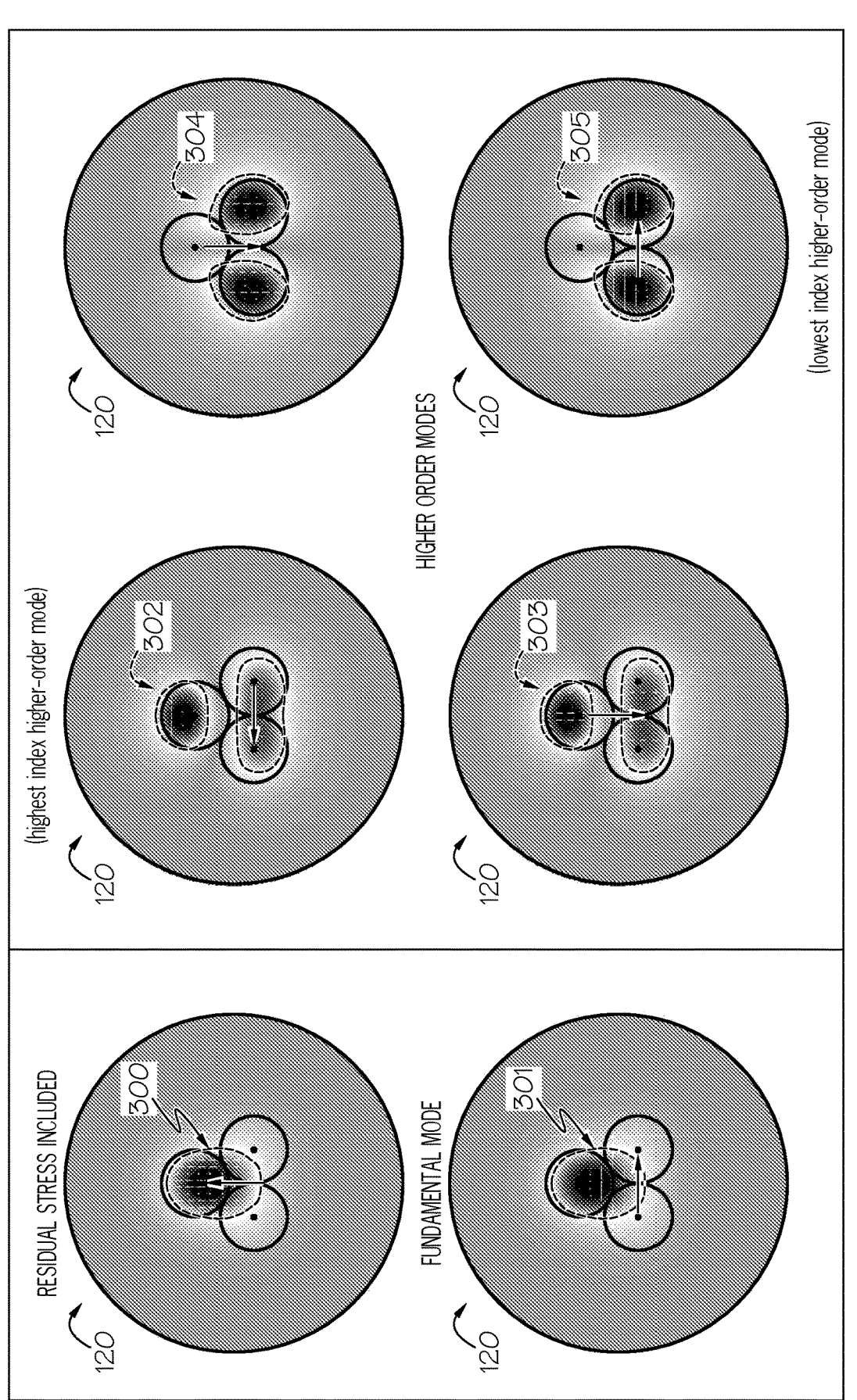
FIG. 6B schematically depicts the spatial mode structure of the second end of a photonic lantern having a silica cladding and two up-down doped claddings, according to one or more embodiments described herein.

Referring now to FIGS. 6A and 6B, the impact on the differing compositions of claddings on the spatial mode structure of the second end 124, 124' of photonic lanterns 120, 120' is shown. FIG. 6A schematically depicts modeled results of the spatial mode structure of the second end 124' of an example photonic lantern 120' having claddings with equal effective refractive indices at the second end 124'. In FIG. 6A, the claddings have equal effective indices because the residual stress effects are not included. FIG. 6B schematically depicts modeled results of the spatial mode structure of the second end 124 of the photonic lantern 120, which comprises the silica cladding 134C and the up-down doped claddings 134A, 134B. In FIG. 6B, these differing compositions cause residual stress effects and thereby differing refractive indices in the tapered region (not shown) and at the second end 124.

Referring now to FIG. 6A, the first polarization $LP_{01}$ mode spatial mode structure is shown by region 300' and the second polarization $LP_{01}$ mode spatial mode structure is shown by region 301'. Furthermore, regions 302', 303', 304', and 305' show four higher order modes (counting polarization) in the second mode group. In FIG. 6A, the higher order spatial mode structures shown by regions 302'-305' are not linearly polarized because the direction of their polarization is not the same throughout the mode. Thus, the higher order spatial mode structures shown by regions 302'-305' are not true $LP_{11}$ modes and thus are poorly matched to the corresponding modes of the multi-mode optical fiber 110 and thus there is poor coupling efficiency between this example photonic lantern and the multi-mode optical fiber 110. This reduces the coupling efficiency between this example photonic lantern and the multi-mode optical fiber 110 and may prevent the individual excitation of fundamental and higher order mode groups in the multi-mode optical fibers. In addition, because all three optical fibers of the example photonic lantern of FIG. 6A have the same composition and size, their symmetry causes the optical fibers to excite the same pattern of modes, each rotated by 120°.

Referring now to FIG. 6B, the first polarization $LP_{01}$ mode spatial mode structure is shown by region 300 and the second polarization $LP_{01}$ mode spatial mode structure is shown by region 301. The first polarization of the first $LP_{11}$ mode spatial mode structure is shown by region 302 and the second polarization of the first $LP_{11}$ mode spatial mode structure is shown by region 303. The first polarization of the second $LP_{11}$ mode spatial mode structure is shown by region 304 and the second polarization of the second $LP_{11}$ mode spatial mode structure is shown by region 305. As shown by FIG. 5B, the differing effective indices of the up-down doped cladding 134A, 134B with respect to the silica cladding 134C alters the spatial structure of the mode groups propagating in the photonic lantern 120 such that these mode groups retain modal isolation along the length of the photonic lantern 120. In FIG. 6A, the $LP_{01}$ mode spatial mode structure and first and second $LP_{11}$ mode spatial mode structures shown by regions 300-305 are linearly polarized. This spatial structure aligns well with the spatial structure of the fundamental mode and the first two higher order modes of the multi-mode optical fiber 110. In other words, the $LP_{01}$ mode spatial mode structure and first and second $LP_{11}$ mode spatial mode structures shown by regions 300-305 have a large overlap integral with the spatial structure of the fundamental mode and the first two higher order modes of the multi-mode optical fiber 110, increasing the coupling efficiency between the photonic lantern 120 and the multi-mode optical fiber 110.

Figures 7A, 7B:
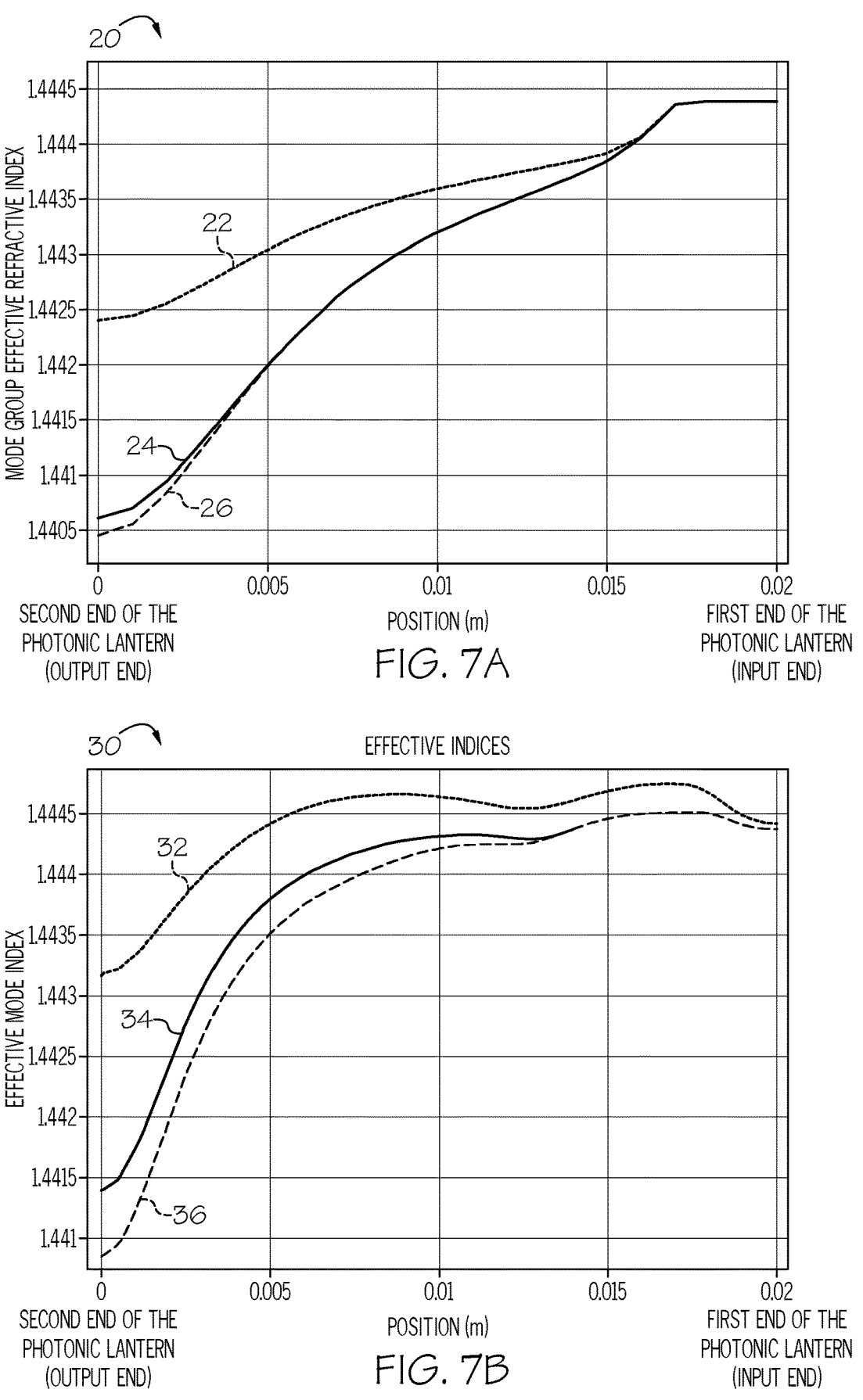
FIG. 7A graphically depicts the effective refractive indices of the claddings of the photonic lantern of FIG. 6A, according to one or more embodiments described herein.
FIG. 7B graphically depicts the effective refractive indices claddings of the photonic lantern of FIG. 6B, according to one or more embodiments described herein.

Referring now to FIGS. 7A and 7B, graph 20 (FIG. 7A) shows the effective refractive indices of the claddings of the photonic lantern 120' of FIG. 6A and graph 30 (FIG. 7B) shows the effective refractive indices of the photonic lantern 120 of FIG. 6B from the first end 122, 122' of the photonic lantern 120, 120' to the second end 124, 124' of the photonic lantern, 120'. In graph 20, line 22 shows the effective refractive index of the $LP_{01}$ mode, line 24 shows the effective refractive index of the first $LP_{11}$ mode, and line 26 shows the effective refractive index of the second $LP_{11}$ mode. As shown by lines 24 and 26, the effective refractive indices of the first and second $LP_{11}$ modes overlap along a substantial portion of the photonic lantern 120' and remain fairly close at the second end 124' of the photonic lantern 120'. This modal overlap reduces the modal isolation between the first and second $LP_{11}$ modes, reducing the coupling efficiency between the photonic lantern 120' and the multi-mode optical fiber 110. In graph 30, line 32 shows the effective refractive index of the $LP_{01}$ mode, line 34 shows the effective refractive index of the first $LP_{11}$ mode, and line 36 shows the effective refractive index of the second $LP_{11}$ mode. As shown by lines 32-36, the effective refractive indices of the $LP_{01}$ mode and the first and second $LP_{11}$ modes diverge along the length of the photonic lantern 120 (i.e., in the tapered region 123) and remain different enough to retain modal isolation between one another.

Referring again to FIGS. 1-3, in operation, light may be directed into the first end 122 of the photonic lantern 120, in particular, into the cores 132A, 132B, 132C of each of the three or more optical fibers 130A, 130B, 130C of the photonic lantern 120. The light propagates in a propagation direction 102. At the first end 122 of the photonic lantern 120, the light is guided by the cores 132A, 132B, 132C. However, as the photonic lantern 120 (there therefore the cores 132A, 132B, 132C) tapers, the diameter of the cores 132A, 132B, 132C become too small to guide the light, which spreads into the claddings 134A, 134B, 134C. When the mode fields of light propagating in each optical fiber 130A, 130B, 130C spread from the cores 132A, 132B, 132C into the cladding 134A, 134B, 134C as the photonic lantern 120 tapers, the difference in their mode field effective indices would approach zero if the effective refractive index of the claddings 134A, 134B, 134C were the same for all the optical fibers 130A, 130B, 130C. This would cause unwanted mode field overlap and mode group coupling.

However, because the material properties of the up-down doped claddings 134A, 134B cause a change in effective refractive index relative to the silica cladding 134C as the photonic lantern 120 tapers, the mode fields of light propagating in the photonic lantern 120 do not overlap and instead retain modal isolation. In operation, the light propagating in the photonic lantern 120 is output at the second end 124 of the photonic lantern 120 and is received at the first end 112 of the multi-mode optical fiber 110, where it excites the fundamental mode and at least two higher order modes of the multi-mode optical fiber 110. For example, the multi-mode optical fiber 110 comprises a mode structure aligned with the mode structure of the light exiting the second end 124 of the photonic lantern 120 such that a mode coupling efficiency between the three or more optical fibers of the photonic lantern and the multi-mode optical fiber is 79% or greater for a fundamental mode and at least two higher order modes excited in the multi-mode optical fiber, such as 80% or greater 85% or greater, 90% or greater, 92% or greater, 94% or greater, 95% or greater, 96% or greater, 98% or greater, 99% or greater, or a value in a range having any two of these values as endpoints.

Light propagating in each optical fiber 130 of the photonic lantern 120 is propagating in the fundamental mode of the particular optical fiber 130. Specifically, the fundamental mode of the core 132 and later, once the light spreads to the cladding 134, the fundamental mode of the cladding 134, which corresponds with the effective index of the cladding 134. If the tapered region 123 of the photonic lantern 120 is adiabatic, the nondegeneracy between the mode groups is maintained through the length of the photonic lantern 120. Thus, the modes of light exiting the second end 124 of the photonic lantern 120 with the highest effective refractive index will excite the mode of the multi-mode optical fiber 110 with the highest mode group refractive index. Indeed, while still not intending to be limited by theory, light exiting the silica cladding 134C of the photonic lantern 120 will excite the $LP_{01}$ mode of the multi-mode optical fiber 110 and light exiting the up-down doped claddings 134A, 134B of the photonic lantern 120 will excite the first and second $LP_{11}$ modes of the multi-mode optical fiber 110, or linear combinations thereof.

For the taper of the photonic lantern to be adiabatic, the coupling or beat length between the modes in question (typically the fundamental mode and the nearest cladding mode) should be much less than the taper length scale. This condition may be expressed as:

$$\Omega \ll \frac{\rho(\beta_1 - \beta_2)}{2\pi},$$

where $\rho$ is the local core radius in the taper, $$\Omega = \tan^{-1}\left(\frac{d\rho}{dz}\right), \frac{d\rho}{dz}$$

is the local taper angle, and $\beta_1$ and $\beta_2$ are the wave numbers of the two modes, which is described in "Tapered single-mode fibres and devices. Part 1: Adiabaticity criteria." Love, J. D., et al. 5, 1991, IEE Proceedings-J, Vol. 138, pp. 343-354.

Figures 8A, 8B:
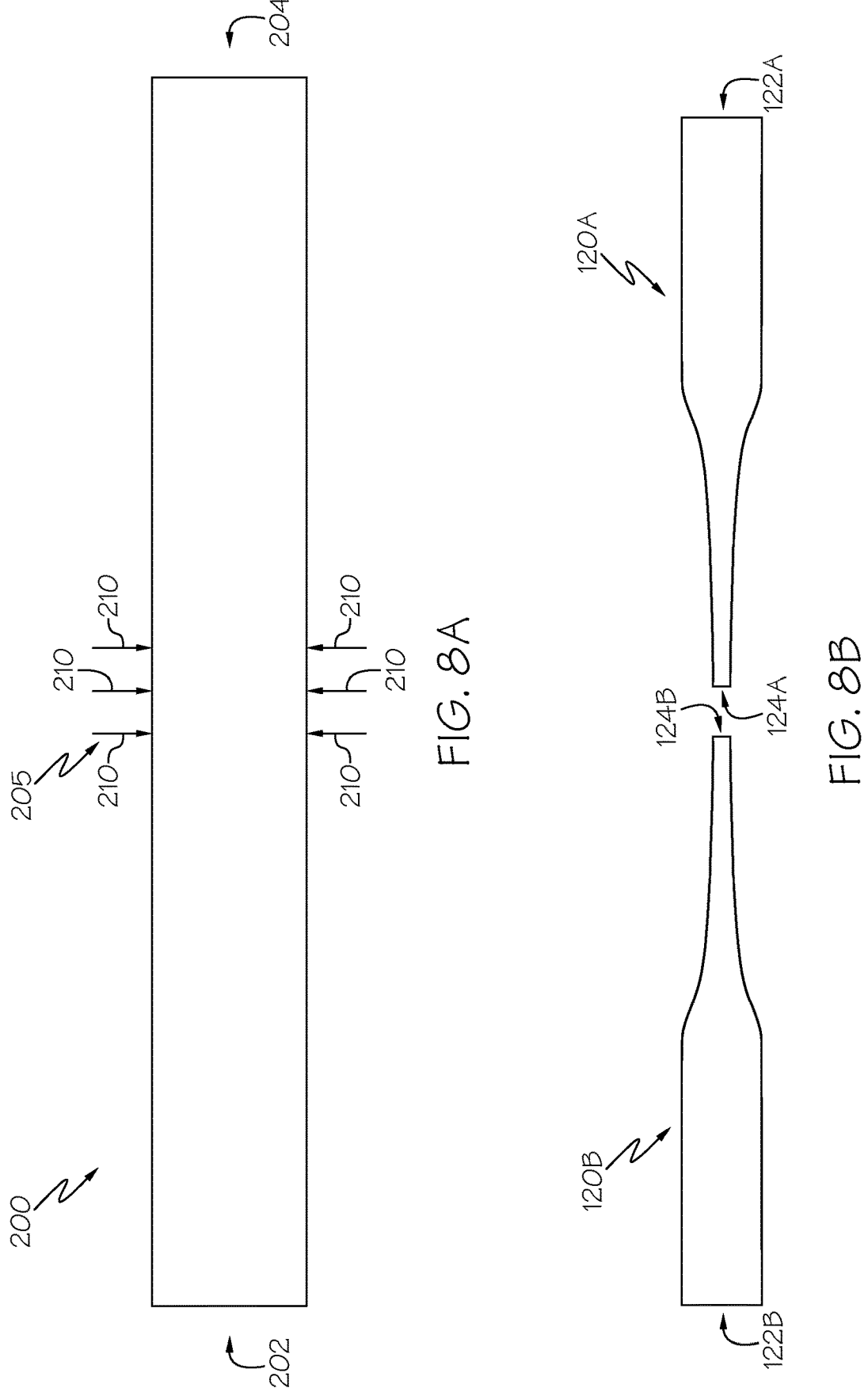
FIG. 8A schematically depicts a photonic lantern preform undergoing a heating processing, according to one or more embodiments described herein.
FIG. 8B schematically depicts two photonic lanterns formed from the photonic lantern preform, according to one or more embodiments described herein.

Referring now to FIGS. 8A and 8B, a method of manufacturing a photonic lantern 120 is schematically depicted. The method includes applying heat (represented by arrows 210) to a central region 205 of a photonic lantern preform 200 which is the preform used to form the photonic lantern 120 and may be used to form two photonic lanterns 120. For example, applying heat to the central region 205 of a photonic lantern preform 200 heats the central region 205 to at least 1600° C., such as at least 1650° C. or at least 1700°

C., using a burner or other heating device that selectively applies heat to the central region 205 of the photonic lantern preform 200. The photonic lantern preform 200 includes the three or more optical fibers 130A, 130B, 130C housed within the glass capillary 136 a first preform end 202 opposite a second preform end 204. The three or more optical fibers 130A, 130B, 130C include at least two up-down doped claddings 134A, 134B and at least one silica cladding 134C. Before applying heat to the photonic lantern preform 200, the diameters of the optical fibers 130A, 130B, 130C and are uniform from the first preform end 202 to the second preform end 204.

Once heat is applied to the photonic lantern preform 200, the method next comprises stretching the photonic lantern preform 200 in a first direction extending from the first preform end 202 and in a second direction extending from the second preform end 204 such that the photonic lantern preform 200 tapers in the central region 205. In some embodiments, stretching the photonic lantern preform 200 occurs while applying heat to the central region 205 at a uniform velocity in both the first direction and the second direction, for example, when the central region 205 comprises a temperature of at least a softening temperature of the glass capillary 136 of the photonic lantern preform 200. As an example, the stretching velocity in the first direction and the second direction may be in a range of from 15 mm/s to 25 mm/s, such as 16 mm/s, 17 mm/s, 18 mm/s, 19 mm/s, 20 mm/s, 21 mm/s, 22 mm/s, 23 mm/s, 24 mm/s, and any range having any two of those values as endpoints. Furthermore, the photonic lantern preform 200 may be stretched a total in a range of from 5 mm to 40 mm, such as from 10 mm to 20 mm, such as such as 8 mm, 10 mm, 12 mm, 15 mm, 18 mm, 20 mm, 22 mm, 25 mm, 28 mm, 30 mm, 32 mm, 35 mm, 38 mm and any range having any two of those values as endpoints. In some embodiments, the method next comprises cooling the photonic lantern preform 200 to room temperature subsequent to stretching the photonic lantern preform 200.

Next, the method comprises separating the central region 205 to form at least one photonic lantern 120 from the photonic lantern preform 200. Separating the central region 205 includes cleaving the central region 205. Separating the central region 205 may also be done by any other know or yet to be developed separation technique. In the embodiment shown in FIG. 8B separating the central region 205 forms a first photonic lantern 120A and a second photonic lantern 120B. The first end 122A (i.e., the larger diameter end) of the first photonic lantern 120A corresponds with the first preform end 202 of the photonic lantern preform 200 and the first end 122B (i.e., the larger diameter end) of the second photonic lantern 120B corresponds with the second preform end 204 of the photonic lantern preform 200. Furthermore, as noted above, stretching the photonic lantern preform 200 in the first direction and the second direction tapers (i.e., reduces the diameter of) the central region 205 such that, after separating the photonic lantern preform 200 in the central region 205, the separating location forms the second end 124A, 124B of the first and second photonic lanterns 120A, 120B, respectively. Thus, the second end 124A, 124B of each of the first and second photonic lanterns 120A, 120B corresponds with the central region 205 of the photonic lantern preform 200.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A photonic lantern comprising:
   three or more optical fibers housed within a glass capillary, each optical fiber comprising a core surrounded by a cladding;
   a first end opposite a second end, wherein the photonic lantern tapers between the first end and the second end such that a diameter of the glass capillary at the first end is greater than a diameter of the glass capillary at the second end;
   the cladding of at least two of the three or more optical fibers comprises an up-down doped cladding doped with a dopant combination comprising an up-dopant and a down-dopant, wherein:
      the up-dopant increases the effective refractive index of the up-down doped cladding;
      the down-dopant decreases the effective refractive index of the up-down doped cladding; and
      the dopant combination decreases a material viscosity of the up-down doped cladding; and
   the cladding of at least one of the three or more optical fibers comprises a silica cladding, wherein a difference in the effective refractive index between the silica cladding and the up-down doped cladding is greater in a tapered region and at the second end of the photonic lantern than at the first end of the photonic lantern.

2. The photonic lantern of claim 1, wherein the three or more optical fibers each comprise a single mode optical fiber.

3. The photonic lantern of claim 1, wherein the effective refractive index of the up-down doped cladding is less than the effective refractive index of the silica cladding in the tapered region and at the second end of the photonic lantern.

4. The photonic lantern of claim 1, wherein the effective refractive index of the up-down doped cladding differs from the effective refractive index of the silica cladding at the second end of the photonic lantern by 0.05% or more.

5. The photonic lantern of claim 1, wherein the effective refractive index of the up-down doped cladding differs from the effective refractive index of the silica cladding at the second end of the photonic lantern by 0.02% or more.

6. The photonic lantern of claim 1, wherein the up-dopant comprises germanium, chlorine, aluminum, titanium, phosphorous, or a combination thereof, and the down-dopant comprises fluorine, boron, or a combination thereof.

7. The photonic lantern of claim 1, wherein the dopant combination comprises 0.05 to 1.5 wt % fluorine and 0.4 to 6 wt % germanium.

8. The photonic lantern of claim 1, wherein the photonic lantern tapers between the first end and the second end such that:

a diameter of the cladding of each of the three or more optical fibers at the first end is greater than a diameter of the cladding of each of the three or more optical fibers at the second end; and a diameter of the core of each of the three or more optical fibers at the first end is greater than a diameter of the core of each of the three or more optical fibers at the second end.

9. The photonic lantern of claim 1, wherein a taper ratio of the glass capillary, the cladding of each of the three or more optical fibers, and the core of each of the three or more optical fibers is from five to twenty.

10. The photonic lantern of claim 1, wherein:

the cladding of each of the three or more optical fibers retain matching diameters from the first end to the second end of the photonic lantern; and the core of each of the three or more optical fibers retain matching diameters from the first end to the second end of the photonic lantern.

11. The photonic lantern of claim 1, wherein the up-down doped cladding comprises a lower material viscosity, a lower elastic modulus, and a different coefficient of thermal expansion than the silica cladding.

12. A method comprising:

directing light into a first end of a photonic lantern, the photonic lantern further comprising:

three or more optical fibers housed within a glass capillary, each optical fiber comprising a core surrounded by a cladding;

a second end opposite the first end, wherein the photonic lantern tapers between the first end and the second end such that a diameter of the glass capillary at the first end is greater than a diameter of the glass capillary at the second end;

the cladding of at least two of the three or more optical fibers comprises an up-down doped cladding doped with a dopant combination comprising an up-dopant and a down-dopant, wherein:

the up-dopant increases the effective refractive index of the up-down doped cladding;

the down-dopant decreases the effective refractive index of the up-down doped cladding; and the dopant combination decreases a material viscosity of the up-down doped cladding; and the cladding of at least one of the three or more optical fibers comprises a silica cladding, wherein:

a difference in the effective refractive index between the silica cladding and the up-down doped cladding is greater in a tapered region and at the second end of the photonic lantern than at the first end of the photonic lantern such that the light propagating from the first end to the second end of the photonic lantern retains modal isolation; and receiving the light output at the second end of the photonic lantern with a first end of a multi-mode optical fiber.

13. The method of claim 12, wherein the multi-mode optical fiber comprises a mode structure aligned with the mode structure of light exiting the second end of the photonic lantern such that a mode coupling efficiency between the three or more optical fibers of the photonic lantern and the multi-mode optical fiber is 79% or greater for a fundamental mode and at least two higher order modes excited in the multi-mode optical fiber.

14. The method of claim 12, wherein the multi-mode optical fiber comprises a mode structure aligned with the mode structure of light exiting the second end of the photonic lantern such that a mode coupling efficiency between the three or more optical fibers of the photonic lantern and the multi-mode optical fiber is 90% or greater for a fundamental mode and at least two higher order modes excited in the multi-mode optical fiber.

15. The method of claim 12, wherein the effective refractive index of the up-down doped cladding differs from the effective refractive index of the silica cladding at the second end of the photonic lantern by 0.05% or more.

16. The method of claim 12, wherein the effective refractive index of the up-down doped cladding differs from the effective refractive index of the silica cladding at the second end of the photonic lantern by 0.02% or more.

17. The method of claim 12, wherein the second end of the photonic lantern is optically coupled to the first end of the multi-mode optical fiber using free-space optics.

18. The method of claim 12, wherein the three or more optical fibers of the photonic lantern comprise single mode optical fibers.

19. A method of manufacturing a photonic lantern, the method comprising:

applying heat to a central region of a photonic lantern preform, the photonic lantern preform comprising:

three or more optical fibers housed within a glass capillary, each optical fiber comprising a core surrounded by a cladding; and a first preform end opposite a second preform end, wherein:

the cladding of at least two of the three or more optical fibers comprises an up-down doped cladding doped with a dopant combination that decreases the effective refractive index of the up-down doped cladding, the dopant combination comprising an up-dopant that increases the effective refractive index of the up-down doped cladding and a down-dopant that decreases the effective refractive index of the up-down doped cladding; and the cladding of at least one of the three or more optical fibers comprises a silica cladding;

stretching the photonic lantern preform in a first direction from the first preform end and in a second direction from the second preform end such that the photonic lantern preform tapers in the central region; and separating the central region to form at least one photonic lantern from the photonic lantern preform, wherein:

the photonic lantern comprises a first end corresponding with the first preform end of the photonic lantern preform and a second end corresponding with the central region of the photonic lantern preform;

the photonic lantern tapers between the first end and the second end such that a diameter of the glass capillary at the first end is greater than a diameter of the glass capillary at the second end; and a difference in the effective refractive index between the silica cladding and the up-down doped cladding is greater in a tapered region and at the second end of the photonic lantern than at the first end of the photonic lantern.

20. The method of claim 19, wherein: (i) applying heat to the central region of a photonic lantern preform heats the central region to a softening point of a glass material of the glass capillary; or ii) stretching the photonic lantern preform occurs while applying heat to the central region and the central region comprises a temperature of at least a softening point of the glass capillary; or (iii) separating the central region forms a first photonic lantern and a second photonic lantern from the photonic lantern preform, wherein:

the first photonic lantern comprises a first end corresponding with the first preform end of the photonic lantern preform and a second end corresponding with the central region of the photonic lantern preform; and the second photonic lantern comprises a first end corresponding with the second preform end of the photonic lantern preform and a second end corresponding with the central region of the photonic lantern preform.

* * * * *